C. O. WESTOVER.
VEHICLE BUMPER.
APPLICATION FILED JULY 20, 1915.
1,224,817.
Patented May 1, 1917.
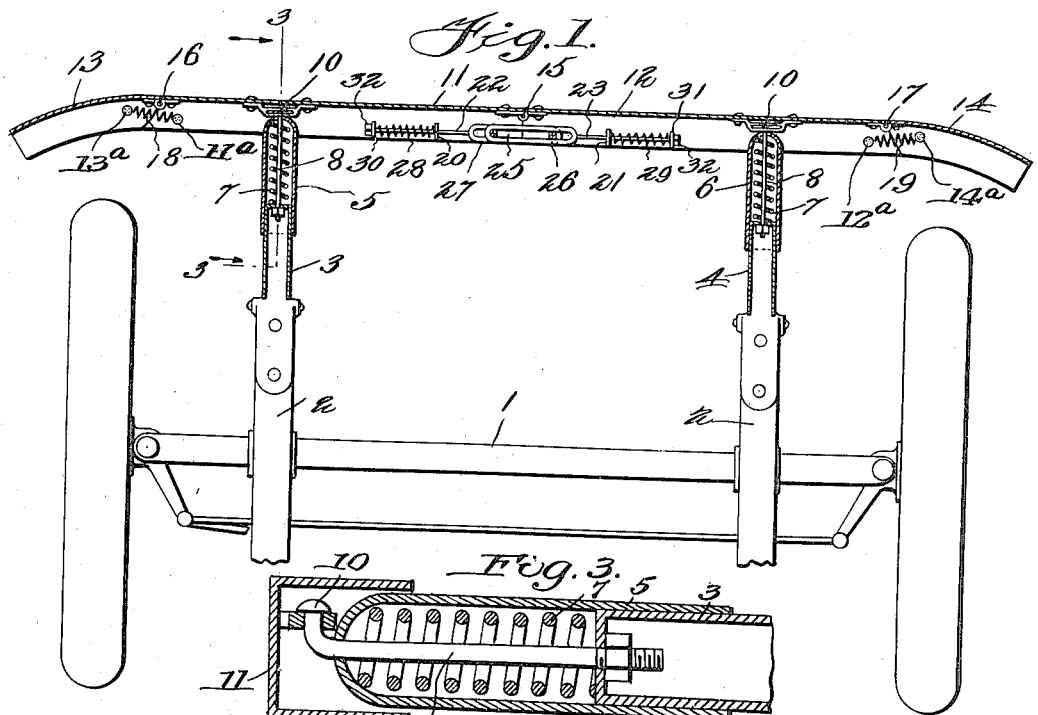
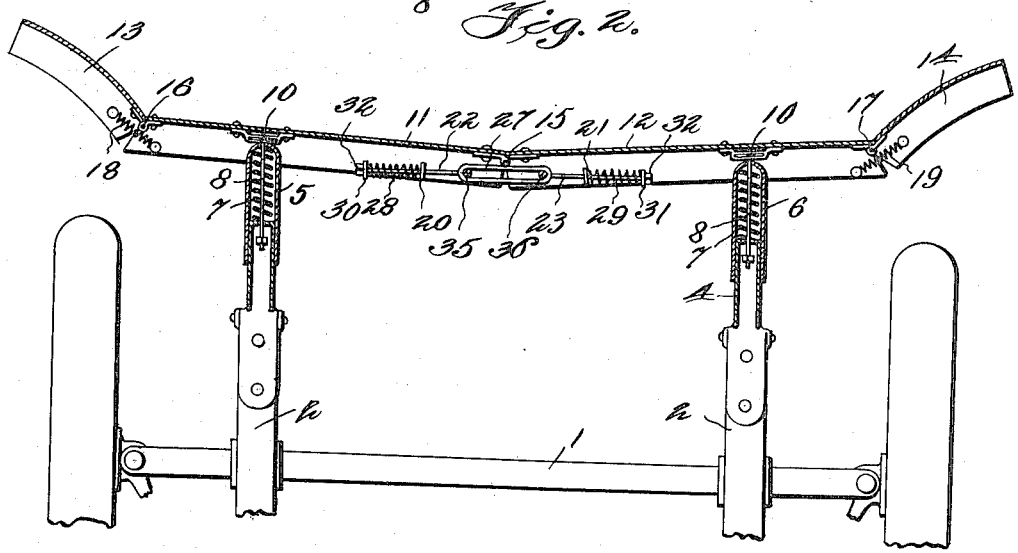
Witnesses
Inventor
C. O. Westover

UNITED STATES PATENT OFFICE.

CLAUDE O. WESTOVER, OF JACKSONVILLE, FLORIDA.

VEHICLE-BUMPER.

1,224,817.  Specification of Letters Patent.  Patented May 1, 1917.

Application filed July 20, 1915. Serial No. 40,932.

*To all whom it may concern:*

Be it known that I, CLAUDE O. WESTOVER, a subject of the King of Great Britain, residing at Jacksonville, in the county of Duval and State of Florida, have invented certain new and useful Improvements in Vehicle-Bumpers; and I do hereby declare the following to be a full, clear, and exact description of the invention, such as will enable others skilled in the art to which it appertains to make and use the same.

This invention relates to bumpers for vehicles, such as automobiles, motor trucks or the like, and the primary object of the invention is to provide a bumper as specified, which is constructed of a plurality of hingedly connected sections so as to provide a flexible bumper which will eliminate the liability of distortion of the bumper upon unequal strain upon the same, and further to provide a bumper which has flexible ends for eliminating the liability of catching objects when backing the vehicle upon which the bumper is mounted, and also eliminating the liability of the ends of the bumper being bent or broken by a vehicle passing the one upon which the bumper is mounted.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a horizontal section through the improved bumper, showing the parts in their normal position, Fig. 2 is a horizontal section through the bumper, showing the parts in operating position, and Fig. 3 is a sectional view on the line 3—3 of Fig. 1.

Referring more particularly to the drawings, 1 designates a section of the front end of the chassis of any suitable type of vehicle, such as an automobile, motor truck or the like, which has side rails 2. The side rails 2 have tubular members 3 and 4 secured thereto and extending forwardly therefrom. Sleeves 5 and 6 are telescopically mounted upon the tubular members 3 and 4. Spiral springs 7 are mounted within the sleeves 5 and 6 and coiled about rods 8. The rods 8 extend through the ends of the tubular members 3 and 4, and are swivelly and slidably connected to the vertical portions of the bumper proper, as is shown at 10.

The bumper proper is of the ordinary U-shape in cross section, and is composed of a plurality of sections 11, 12, 13 and 14. The sections 11 and 12, forming the central portion of the bumper proper, are hingedly connected as is shown at 15, and they extend across the front of the vehicle, having the sections 13 and 14, which are curved, hingedly connected to their outer ends respectively, as is shown at 16 and 17. The sections 13 and 14 are curved, to form the ordinary shaped bumper, and they have contracting spiral springs 18 and 19 secured thereto respectively by a pin 13$^a$ and 14$^a$. The spring 18 extends across the hinge 16 and is also secured to the outer end of the section 11 by a pin 11$^a$, while the spring 19 extends across the hinge 17 and is secured to the outer end of the section 12 by a pin 12$^a$. The springs 18 and 19 tend to hold the hinged end sections 13 and 14 in their proper or normal position, as clearly shown in Fig. 1 of the drawings, and immediately after these end sections have been forced outwardly, upon their hinged connection with the sections 11 and 12, the springs will act to return them to their normal position after the release of pressure from the sections.

The center sections 11 and 12 of the bumper have their facing ends abutting each other, when the bumper is in its normal position. Ears 20 and 21 are secured to the sections 11 and 12, and they slidably support rods 22 and 23. The rods 22 and 23 have their ends secured to the links 26 and 27. The links 26 and 27 span the line of meeting of the sections 11 and 12 and limit the hinged movement of these sections. The rods 22 and 23 have spiral springs 28 and 29 coiled thereabout respectively. The spiral springs 28 and 29 engage the ears 20 and 21, and washers 30 and 31, respectively, which are mounted upon the rods 22 and 23 and held in place by means of nuts 32. Immediately after the sections 11 and 12 have been forced out of their normal position, as is shown in Fig. 2 of the drawings, the springs 28 and 29 will act for automatically returning them to their normal position, as shown in Fig. 1. Pins 35 and 36 are provided for insertion through the slots in the links 26 and 27, and through openings formed in the bumper body, for limiting the hinged movement of the sections and preventing the distortion thereof.

If it is so desired, it is to be understood that the bumper heretofore described may be attached to either the front or rear end of a vehicle without departing from the spirit of this invention.

In reducing the invention to practice, certain minor features of construction, combination, and arrangement of parts may necessitate alteration, to which the patentee is entitled, provided such alterations are comprehended within the scope of what is claimed.

What is claimed is:—

1. In a vehicle bumper, a body portion composed of a pair of alined sections, a hinge connecting the inner ends of the sections to permit said sections to flex rearwardly when the body portion engages an object, means yieldably holding the sections in normal position, and means connecting the sections to a vehicle.

2. In a vehicle bumper, a body portion composed of a pair of alined sections, a hinge connecting the inner ends of the sections to permit said sections to flex rearwardly when the body portion engages an object, means for yieldably holding the sections in and automatically returning them to normal position, and means securing the sections to a vehicle.

3. In a vehicle bumper, a body portion composed of a pair of alined sections, a hinge connecting the inner ends of the sections to permit said sections to flex rearwardly when the body portion engages an object, means for limiting the inward movement of the sections, and means securing the sections to a vehicle.

4. In a vehicle bumper, a body portion composed of a pair of alined sections, a hinge connecting the inner ends of the sections to permit said sections to flex rearwardly when the body portion engages an object, means for limiting the inward movement of the sections, said means also yieldably holding and automatically returning the sections to normal position, and means securing the sections to a wheel.

5. In a vehicle bumper, a body portion composed of a pair of alined sections, a hinge connecting the inner ends of the sections to permit said sections to flex rearwardly when the body portion engages an object, a rod slidably mounted on the inner face of each section, a link secured to the inner end of each rod, means for slidably connecting said links, a coil spring secured to each rod to automatically return and hold the sections to normal position, and means securing the sections to a vehicle.

In testimony whereof I affix my signature in presence of two witnesses.

CLAUDE O. WESTOVER.

Witnesses:
RALPH J. COOPER,
C. F. WHITE.